(12) United States Patent
Mahmoud et al.

(10) Patent No.: US 12,416,570 B2
(45) Date of Patent: Sep. 16, 2025

(54) MEASUREMENT OF IRON IN GLYCOL AND AMINE IN NATURAL GAS PROCESSING

(71) Applicant: Saudi Arabian Oil Company, Dhahran (SA)

(72) Inventors: Mohamed Ahmed Saad Mahmoud, Dammam (SA); Ahmed Hamad Salman, Riyadh (SA); Hassan Yahiya Al-Malki, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 357 days.

(21) Appl. No.: 18/192,358

(22) Filed: Mar. 29, 2023

(65) Prior Publication Data
US 2024/0328934 A1  Oct. 3, 2024

(51) Int. Cl.
*B01D 53/14*  (2006.01)
*B01D 53/26*  (2006.01)
(Continued)

(52) U.S. Cl.
CPC ......... *G01N 21/33* (2013.01); *B01D 53/1406* (2013.01); *B01D 53/1462* (2013.01); *B01D 53/1493* (2013.01); *B01D 53/263* (2013.01); *B01D 53/28* (2013.01); *C10L 3/103* (2013.01); *C10L 3/104* (2013.01);
(Continued)

(58) Field of Classification Search
CPC ............... G01N 21/33; B01D 53/1406; B01D 53/1462; B01D 53/1493; B01D 53/263; B01D 53/28; B01D 2252/2026; B01D 2252/204; B01D 2257/304; B01D 2257/504; B01D 2257/80; C10L 3/103; C10L 3/104; C10L 2290/545;
(Continued)

(56) References Cited

U.S. PATENT DOCUMENTS 4,009,083 A  *  2/1977  Lyon .................... B01D 53/263
                                                          95/255
4,332,769 A     6/1982  Rampy et al.
(Continued)

FOREIGN PATENT DOCUMENTS

CN          102608047           7/2012

OTHER PUBLICATIONS

"Gas Chromatograph Nexis GC-2030," Shimadzu, Brochure, May 2017, 20 pages.
(Continued)

*Primary Examiner* — Dung H Bui
(74) *Attorney, Agent, or Firm* — Fish & Richardson P.C.

(57) ABSTRACT

A natural gas (NG) processing plant and method of operating the NG processing plant including: receiving feed NG, removing acid gas from the feed NG gas via a gas sweetening unit having an amine absorber column that absorbs the acid gas, collecting an amine sample in the gas sweetening unit, removing water from the feed NG via a NG dehydration system having a column vessel that contacts the feed NG with liquid desiccant including glycol to remove the water, collecting a glycol sample in the NG dehydration system, adding reagent water and ferrozine to each of the amine sample and the glycol sample, and measuring total dissolved iron via ultraviolet-visible (UV-Vis) spectrophotometry in each of the amine sample and the glycol sample.

19 Claims, 8 Drawing Sheets

(51) Int. Cl.
  *B01D 53/28* (2006.01)
  *C10L 3/10* (2006.01)
  *G01N 21/33* (2006.01)
(52) U.S. Cl.
  CPC .......... *B01D 2252/2026* (2013.01); *B01D 2252/204* (2013.01); *B01D 2257/304* (2013.01); *B01D 2257/504* (2013.01); *B01D 2257/80* (2013.01); *C10L 2290/545* (2013.01)
(58) Field of Classification Search
  CPC ......... C10L 2290/541; C10L 2290/543; C10L 2290/58; C10L 2290/60; C10L 3/10; C10L 3/106
  See application file for complete search history.

(56) References Cited

U.S. PATENT DOCUMENTS

| | | | |
|---|---|---|---|
| 5,763,281 A | 6/1998 | Weisheit et al. | |
| 6,207,121 B1* | 3/2001 | Rooney | B01D 53/1475 252/189 |
| 2013/0302233 A1* | 11/2013 | Smits | C10L 3/103 423/242.2 |
| 2014/0130416 A1* | 5/2014 | Bara | B01D 71/62 95/51 |
| 2015/0111024 A1* | 4/2015 | Tour | B01D 53/526 95/95 |
| 2015/0125372 A1* | 5/2015 | Stites | B01D 53/1456 252/189 |
| 2015/0232395 A1* | 8/2015 | Nyce | B01J 29/40 585/329 |
| 2015/0303473 A1* | 10/2015 | Theivanayagam | H01M 10/0525 252/182.1 |
| 2016/0175771 A1* | 6/2016 | Guillou | C10L 3/101 423/210 |
| 2016/0289571 A1* | 10/2016 | Storey | B01D 53/1493 |
| 2018/0272267 A1* | 9/2018 | Kondo | C08F 214/06 |
| 2018/0297845 A1* | 10/2018 | Mengel | C01B 17/64 |
| 2018/0305273 A1* | 10/2018 | Patel | C07C 2/84 |
| 2018/0318760 A1* | 11/2018 | Hirata | B01D 53/78 |
| 2019/0099711 A1* | 4/2019 | Hatton | B01D 61/422 |
| 2019/0168131 A1* | 6/2019 | Haroun | B01D 53/18 |
| 2019/0240675 A1* | 8/2019 | Banat | B03C 1/0335 |
| 2020/0061523 A1* | 2/2020 | Cullinane | B01D 53/1406 |
| 2020/0155996 A1* | 5/2020 | Okamoto | B01J 45/00 |
| 2021/0371387 A1* | 12/2021 | Bara | C10L 3/102 |
| 2021/0389255 A1* | 12/2021 | Locklear | G01N 21/31 |
| 2022/0056064 A1* | 2/2022 | Qazvini | B01J 20/2803 |
| 2023/0183588 A1* | 6/2023 | Al-Qahtani | C10L 3/104 423/302 |
| 2024/0001337 A1* | 1/2024 | Al Hamouz | B01J 20/262 |
| 2024/0053317 A1 | 2/2024 | Mahmoud et al. | |
| 2024/0131467 A1* | 4/2024 | Ferreira Do Nascimento | B01D 53/1468 |
| 2024/0216892 A1* | 7/2024 | Gianneschi | B01J 20/28069 |
| 2024/0269620 A1* | 8/2024 | Starostine | B01D 67/0037 |
| 2024/0271779 A1* | 8/2024 | Blaies | C10L 3/101 |
| 2024/0390865 A1* | 11/2024 | Chisca | B01D 69/02 |

OTHER PUBLICATIONS

[No Author Listed] [online], "Standard Guide for Ultra-Pure Water Used in the Electronics and Semiconductor Industries," American Society for Testing and Materials International, (ASTM) D5127-13, Nov. 2018, 3 pages.

Åberg et al., "Evaluating a fast headspace method for measuring DIC and subsequent calculation of pCO2 in freshwater systems," Inland Waters, 2014, 4(2):157-166, 11 pages.

Bastviken et al., "Technical Note: Cost-efficient approaches to measure carbon dioxide (CO2) fluxes and concentrations in terrestrial and aquatic environments using mini loggers," Biogeosciences, 2015, 12:3849-3859, 11 pages.

Hope et al., "A method for measuring free CO in upland streamwater using headspace analysis," Journal of Hydrology, Mar. 1995, 166: 1-2, 1-14, 14 pages.

Kampbell, "Dissolved Oxygen and Methane in Water by a GC Headspace Equilibration Technique" International Journal of Environmental Analytical Chemistry, 1989, 36(4), 10 pages.

Pfeiffer et al., "Comparative performance of CO2 measuring methods: Marine aquaculture recirculation system application," Aquacultural Engineering, 2011 44:1-9, 10 pages.

Sarradin et al., "Analysis of dissolved gases by headspace sampling gas chromatography with column and detector switching. Preliminary results," Analytical Communications, 33:371-373, Oct. 1996, 3 pages.

Stainton, "A Syringe Gas-stripping Procedure for Gas-Chromatographic Determination of Dissolved Inorganic and Organic Carbon in Fresh Water and Carbonates in Sediments," Fisheries Research Board of Canada, 1973, 30(10), 5 pages.

Wachowiak et al., "Distribution of Hydrogen Sulphide in Rats' Organs and Associated Histological Changes in Experimental Intoxication," Problems of Forensic Sciences, 2000, 8 pages.

* cited by examiner

MEASUREMENT OF IRON IN GLYCOL AND AMINE IN NATURAL GAS PROCESSING

TECHNICAL FIELD

This disclosure relates to measuring total dissolved iron in glycol samples and amine samples in a natural gas processing plant.

BACKGROUND

A natural gas (NG) processing plant may be a facility that "cleans" raw natural gas to produce what is known as 'pipeline quality' dry natural gas. The NG processing plant may employ multiple unit operations to process the natural gas.

SUMMARY

An aspect relates to a method of operating a natural gas processing plant, including: receiving feed natural gas; removing acid gas from the feed natural gas via a gas sweetening unit comprising an amine absorber column that absorbs the acid gas from the feed natural gas into amine comprising liquid amine to remove the acid gas from the feed natural gas; collecting an amine sample of the amine in the gas sweetening unit; removing water from the feed natural gas via a natural gas dehydration system comprising a column vessel that contacts the feed natural gas with liquid desiccant comprising glycol to remove the water from the feed natural gas; collecting a glycol sample of the glycol in the natural gas dehydration system; adding reagent water and ferrozine to each of the amine sample and the glycol sample; and measuring total dissolved iron via ultraviolet-visible (UV-Vis) spectrophotometry in each of the amine sample and the glycol sample.

Another aspect relates to a method of operating a natural gas processing plant, including: receiving feed natural gas; removing acid gas from the feed natural gas via a gas sweetening unit comprising an amine absorber column that absorbs the acid gas from the feed natural gas into amine including liquid amine to remove the acid gas from the feed natural gas; measuring total dissolved iron in an amine sample of the amine via a first online ultraviolet-visible (UV-Vis) spectrophotometer system disposed along an amine conduit conveying the amine in the gas sweetening system, wherein the first online UV-Vis spectrophotometer system includes an amine sampling system having an amine sample conduit coupled to the amine conduit to collect the amine sample from the amine flowing through the amine conduit; removing water from the feed natural gas via a natural gas dehydration system comprising a column vessel that contacts the feed natural gas with liquid desiccant comprising glycol to remove the water from the feed natural gas; and measuring total dissolved iron in a glycol sample of the glycol via a second online UV-Vis spectrophotometer system disposed along a glycol conduit conveying the glycol in the natural gas dehydration system, wherein the second UV-Vis spectrophotometer system includes a glycol sampling system having a glycol sample conduit coupled to the glycol conduit to collect the glycol sample from the glycol flowing through the glycol conduit.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Figure 1:
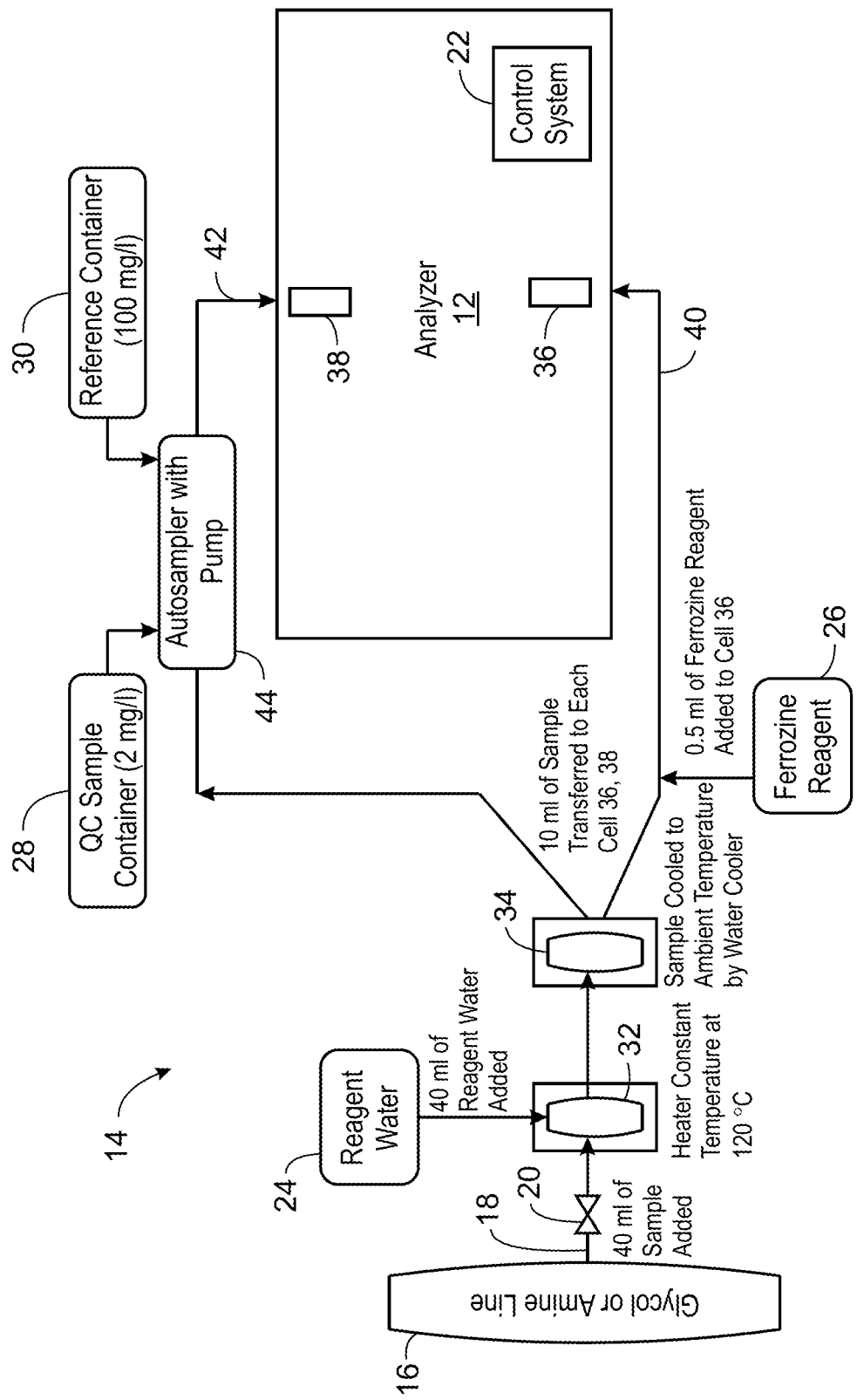
FIG. 1 is a diagram of an online UV-Vis spectrophotometer system.

A natural gas (NG) processing plant (onshore or offshore) may dehydrate natural gas by removing water (e.g., water vapor) from the natural gas, and sweeten natural gas by removing acid gas (e.g., hydrogen sulfide). Some aspects of the present disclosure are directed to an analysis technique employing ultraviolet-visible (UV-Vis) spectrophotometry to determine total iron in glycol in gas dehydration (glycol-based) and in liquid amine in gas sweetening (amine-based). The total iron may be total dissolved iron. The total iron may be determined (measured) with a UV-Vis spectrophotometer. The analysis technique may be applied to determine total iron (e.g., total dissolved iron) in glycol in a natural gas dehydration unit (system) and in liquid amine in a gas sweetening unit (system).

Samples of the glycol and the liquid amine may be manually collected (e.g., by a human operator via a manual valve) from the respective units and analyzed via the UV-Vis spectrophotometer, for example, in a laboratory. For instance, the liquid amine sample may be manually collected from a sweetening tower or piping in the gas sweetening unit. The liquid amine sample may be manually collected by a human operator via a dedicated sample point on piping (on a conduit that is a pipe).

On the other hand, samples of the glycol and the liquid amine may be automatically collected (e.g., by a sampling system associated with the UV-Vis spectrophotometer as an online analytical instrument) from the respective units and online analyzed via the online UV-Vis spectrophotometer.

The total dissolved iron concentration (e.g., including ferric $Fe^{3+}$ ions and ferrous $Fe^{2+}$ ions) in glycol samples from natural gas dehydration units (glycol-based) and in liquid amine samples from gas sweetening units (e.g., from gas sweetening towers employing liquid amine) may be an indicator of the internal corrosion rate in the systems and in a NG processing plant (facility) generally, and in natural gas pipeline(s) providing natural gas for processing to the NG processing plant. The source of the iron in the glycol and liquid amine may be iron oxides formed in the corrosion of metal piping and equipment, which could occur, for example, due to the sour gas received and treated having hydrogen sulfide gas, and other reasons.

For quantification of total iron concentration in glycol and amine samples from sour gas dehydration and sweetening units, respectively, embodiments of the present techniques employ a UV-Vis spectrophotometer rather than relying on the traditional test by the more complicated inductively coupled optical emission spectroscopy (ICP-OES). Utilization of a UV-Vis spectrophotometer is generally more straightforward than employing ICP-OES. An advantage of the present techniques is that embodiments herein may be applicable for typical operators and lab technicians in a NG processing plant or facility (onshore, or at offshore platform) using UV-Vis spectrophotometer for quantification of total iron concentrations in glycol and amine samples (from sour gas dehydration and sweetening units, respectively) instead of utilizing ICP-OES that generally requires a qualified lab scientist (often off-site).

An advantage of the present embodiments with a UV-Vis spectrophotometer may be less capital expenditure and less operating cost compared to conventional technique with the advanced ICP-OES. An advantage may be less turnaround time of reporting or receiving the analytical results for the total dissolved iron. Embodiments with the UV-Vis spectrophotometer can be performed onsite, whereas ICP-OES may more likely be performed at off-site laboratories. For offshore gas processing (at an offshore platform or facility), the present techniques may avoid sending glycol samples or liquid amine samples to onshore labs or third-party laboratories, as may commonly be done for ICP-OES analysis of offshore samples.

Embodiments of present measurement of total dissolved iron via UV-Vis spectrophotometry may generally be free of interference of carryover condensate hydrocarbons, BTEX (benzene, toluene, ethylbenzene and xylene), hydrogen sulfide ($H_2S$), and additives (from the amine or glycol). Again, embodiments may facilitate conducting measurement of the total dissolved iron in glycol and amine samples with relatively straightforward test method that can be utilized by the typical lab technician or offshore operator, and at less cost than cost for ICP-OES instrument and its accessories. Embodiments may measure dissolved iron in a glycol sample and in an amine sample with relatively straightforward technique of sample preparation to overcome interference by field operator and lab technician. The total dissolved iron may include $Fe^{2+}$, $Fe^{3+}$, and any portions of suspended corrosion products such as iron oxides or iron sulfides that become dissolved as complexes or molecules. The $Fe^{2+}$ and $Fe^{3+}$ are ions and can be labeled as radicals or free radicals.

For collecting samples and analyzing the samples by UV-Vis spectrophotometry, an Example procedure includes initially collecting the samples. In particular, this Example procedure includes collecting glycol samples from the NG dehydration system and collecting liquid amine samples from the gas sweetening system. In this Example, the samples are collected as an offline sample to be analyzed not online but at an on-site testing area or laboratory. The samples may be collected, for instance, in a container (e.g., a clean and dry plastic bottle) [e.g., 150-milliliter (ml) plastic bottle]. In implementations, the samples collected may be analyzed for total dissolved iron within four hours of collection. In this Example, the glycol is triethylene glycol (TEG) and the liquid amine is methyldiethanolamine (MDEA).

In the Example procedure for each of the glycol samples and the liquid amine samples, a 50 ml mixture of 10 ml of the sample, 39 ml of water (e.g., deionized water, ultrapure water, etc.), and 1 ml of 10 volume percent (vol %) nitric acid in water was prepared. The 50 ml mixture was mixed and heated for about 30 minutes until 50% of the 50 ml mixture was evaporated to remove dissolved hydrocarbons and acid gases. The heating in presence of the acid can be characterized as digesting the sample in the mixture. Due to heating, water evaporates. The amine or glycol generally do not evaporate because of their high boiling points.

Water (as make up) was added to return the mixture to 50 ml. In this Example, the water utilized to form the 50 ml mixture and as make up was ultrapure water (UPW) as defined by American Society for Testing and Materials International (ASTM) D5127-13 (Nov. 13, 2018). After adding the make-up water, the pH was adjusted with addition of sodium carbonate to increase the pH to 7-8.5 to avoid cross linkage with traces of amines or amine derivatives (for both the glycol samples and the amine samples). This may overcome the possible turbidity caused by side reactions with ferrozine. Amine derivatives may be additives that have amines. For instance, there may be traces of amine derivatives in the glycol (TEG) samples due to use, for example, of ethanolamine and/or diethanolamine additives at some operating facilities to increase TEG pH.

Ferrozine as a ferrozine indicator was added to the mixture, forming a purple-colored complex in the mixture which measured by UV-Vis spectrophotometer instrument at 565 nanometer (nm). The ferrozine utilized was FerroZine® Iron Reagent, 500 mL, Product Number 230149, available from Hach Company having headquarters in Loveland, Colorado, USA. A purpose of adding the ferrozine indicator (to give the purple color—565 nm) is for the UV-Vis spectrophotometry. The respective prepared mixtures from all samples measured at the wavelength 565 nm. The ferrozine may form a complex with $Fe^{2+}$ to turn the sample (mixture) purple. The ferrozine may form a complex with $Fe^{3+}$ to turn the sample (mixture) purple.

Indicators (e.g., phenanthroline) other than ferrozine may be employed for application of UV-Vis spectrophotometry for chemical analysis of iron in solution. However, the peak may be not broad and there could be interference. For instance, there could be phosphate or heavy metal interferences with phenanthroline.

The UV-Vis spectrophotometer employed in the Example was LAMBDA™ 365 UV-Vis spectrophotometer available from PerkinElmer, Inc. having headquarters in Waltham, Massachusetts USA. In this Example procedure for method validation, initially the UV-Vis spectrophotometer instrument was calibrated through an analysis procedure—applied for both glycol (glycol-based matrix) and amine (amine-based matrix). The matrix means the media utilized to prepare the standard contained 10 vol % of the amine in water and 10 vol % of the glycol in water, respectively. For instance, the amine referred to the amine sample, and the amine-based matrix refers to water having a specific amount (10 vol %) of the amine for application with the instrument.

Two calibration procedures were established: [1] one with glycol as purchased TEG and with amine as purchased N-methyldiethanolamine; and [2] another with glycol as 75 vol % of the collected glycol sample in ultrapure water and with amine as 75 vol % of the collected amine sample in ultrapure water. A National Institute of Standards and Technology (NIST) traceable iron standard was utilized for calibrating standards. The NIST traceable iron standard was Iron (Fe) Pure Standard, 1,000 µg/mL, 2% $HNO_3$, 125 mL available from PerkinElmer, Inc. This NIST traceable iron standard is referred to here as stock solution.

A first standard at 1 mg/l [1 mg iron (Fe) as total iron per liter] was prepared with 0.1 ml of stock solution (taken using calibrated adjustable pipette) diluted with glycol matrix (10 vol % glycol in distilled water) up to 100 ml and diluted with amine matrix (10 vol % amine in distilled water) to 100 ml, respectively. A second standard at 4 mg/l [4 mg iron (Fe) as total iron per liter] prepared with 0.4 ml of stock solution diluted with the glycol matrix up to 100 ml and diluted with the amine matrix up to 100 ml, respectively. A third standard at 0.5 mg/l [0.5 mg iron (Fe) as total iron per liter] was prepared with 0.05 ml of stock solution diluted with the glycol matrix up to 100 ml and diluted with the amine matrix up to 100 ml, respectively.

The calibration procedure was performed utilizing rear single detection of the LAMBDA™ 365 UV-Vis spectrophotometer with absorption scanning range (measurement range) from 700 nm up to 380 nm. The instrument data interval and the instrument spectral bandwidth (SBW) were each 1.0 nm. The beam type was double normal, and the lamp change was 390 nm. The instrument accessory was auto sampler, the utilized wavelength was 565 nm, the intercept=yes, the fit order=linear, and the standard concentrations were the aforementioned 1 mg/l, 4 mg/l, and 0.5 mg/l. Calibration curves were generated and data analysis performed. Table 1 below gives method verification of an example of the present technique with the UV-Vis spectrophotometer against the traditional technique of employing ICP-OES. The ICP-OES instrument employed was Avio® 200 ICP-OES available from PerkinElmer, Inc. The units in Table 1 are parts per million by volume (ppmv) of iron as total iron, which can include $Fe^{2+}$ and/or $Fe^{3+}$, with no other iron. Table 1 compares the values between ICP-OES and the readings from UV-Vis spectrophotometer instrument. To be accepted, the acceptance criterion was that the results with the two different techniques each be within 20% of the true/theoretical value.

TABLE 1

Method Validation against ICP-OES

| Prepared Standard | Theoretical Value (ppmv) | Present Embodiment* (ppmv) | ICP-OES (ppmv) | Remarks |
|---|---|---|---|---|
| First standard | 1 | 1.0 | 1.03 | Accepted |
| Second standard | 4 | 3.98 | 4.35 | Accepted |
| Third Standard | 0.5 | 0.44 | 0.56 | Accepted |
| Iron in TEG 10% matrix | 1 | 1.0 | 0.98 | Accepted |

*UV-Vis spectrophotometer with ferrozine technique.

Table 2 give measurement results of total dissolved iron in TEG samples collected around a TEG contactor column (e.g., absorber of FIG. 5) in a NG dehydration system. In particular, samples were collected from piping having lean TEG (lean in water) flowing to the column, and from piping having rich TEG (rich in water) flowing from the column. Measurement of the total dissolved iron in the TEG samples with a UV-Vis spectrophotometer was compared (verified) against measurement of the total dissolved iron in the TEG samples with two ICP-OES instruments. The two ICP-OES instruments were [1] Agilent 720 ICP-OES available from Agilent Technologies, Inc. having headquarters in Santa Clara, California USA and [2] Varian 700 series ICP-OES from Varian, Inc., now part of Agilent Technologies, Inc. As can be seen in Table 2, the UV-Vis spectrophotometer measurement results matched generally acceptable with the ICP-OES measurement results.

TABLE 2

Measurement Results of Total Dissolved Iron in TEG Samples

| Sample Number | Iron Concentration by Agilent ICP-OES (ppmv) | Iron Concentration by Varian ICP-OES (ppmv) | Iron Concentration by UV-Vis Spectrophotometer (ppmv) | Difference in ppmv |
|---|---|---|---|---|
| 1 | 0.42 | 0.40 | 0.41 | 0.02 |
| 2 | 0.39 | 0.42 | 0.44 | 0.02 |
| 3 | 0.66 | 0.64 | 0.60 | 0.03 |
| 4 | 0.77 | 0.73 | 0.72 | 0.02 |
| 5 | 0.27 | 0.31 | 0.30 | 0.03 |

Table 3 below gives criteria associated with costs of the conventional technique of employing ICP-OES to determine total dissolved iron in comparison to present embodiments to determine total dissolved iron with a UV-VIS spectrophotometer and sample pre-treatment. The comments in Table 3 are only given as an example and not intended to limit the present techniques. Again, Table 3 provides a comparison between determination of iron concentration by ICP-OES versus by spectrophotometer with specified sample pre-treatment procedure.

TABLE 3

Comparison of Traditional Test by ICP-OES versus Present Test Embodiments by Spectrophotometer

| Comparison Criteria | ICP-OES Instrument | Spectrophotometric Technique |
|---|---|---|
| Method Complexity | Instrument generally requires experienced Lab Scientist. | The instrument can be operated by Lab Technician. |
| Additional Cost | Instrument requires pure argon gas with additional pure oxygen gas to eliminate carbonization. | No additional accessories generally utilized. |
| Consumables | Specific glassware and accessories for ICP-OES are typically required, such as Torch, Spray Chamber, Nebulizer and Tubing. | Typically only the spectrophotometer and a normal sample cell. |
| Cost per Sample | Cost of sample analysis via ICP-OES sample is about 10 times more than sample analysis via the spectrophotometer, due to the accessories, consumables, and additional man-hours associated with the ICP-OES. | |

In embodiments of the present techniques, a sample of fluid in natural gas processing may be collected (manually collected or automatically collected) for analysis via a UV-Vis spectrophotometer for total dissolved iron content (total dissolved iron concentration) in the sample. The fluid may typically be liquid. The fluid may be glycol in a NG dehydration unit. The fluid may be liquid amine in a gas sweetening unit. The fluid may be characterized as a utility fluid in being reused and not product. The fluid may be characterized as a process fluid, though the fluid is not natural gas. In implementations, the fluid sample may be subjected to UV-Vis spectrophotometry (via a UV-Vis spectrophotometer), such as in a building, e.g. a laboratory or control room. The building may be onsite at the NG processing plant or facility, onshore or offshore. The fluid sample may be subjected to UV-Vis spectrophotometry via an online UV-Vis spectrophotometer.

The fluid sample (e.g., glycol sample or amine sample) collected may be treated (pre-treated) prior to the analysis via the UV-Vis spectrophotometer. In particular, reagent water (e.g., deionized water, ultrapure water, etc.) may be added to a volume of the sample. The volume of the sample may be, for example, 10 ml or in the range of 5 ml to 30 ml, and the amount of reagent water added may be, for example, 40 ml or in a range of 20 ml to 60 ml. The reagent water may be added to facilitate the analysis of the sample in the UV-Vis spectrophotometer. The reagent water may be added to lighten the color of the sample. The added reagent water dilutes the sample. The reagent water may include acid. In the reagent water, the acid may be, for example, 10 vol %, or in the ranges of 5 vol % to 20 vol %, or 5 vol % to 15 vol %. The acid may be, for example, nitric acid ($HNO_3$). The acid via acid digestion in the sample may remove (or promote removal of) dissolved gases from the sample and dissolved hydrocarbon (e.g., BTEX) from the sample. For instance, nitric acid may convert metal ions into their nitrate salts, which are highly soluble and may destabilize hydrocarbons to be evaporated. The dissolved gases and dissolved hydrocarbon removed are evolved from the sample, for instance, into a laboratory fume hood. A carbonate (e.g., sodium carbonate) may be added to the volume of sample being treated to adjust (increase) the pH of the sample to, for example, in a range of 7 to 8.5. After the addition of the reagent water and the carbonate, the volume of sample (and the sample mixture) to be analyzed may be relatively clear in appearance.

In the pre-treatment, ferrozine is added to the volume of sample (the sample mixture). The sample mixture may be the sample, reagent water (including acid) added, carbonate added, and the ferrozine added. Ferrozine is generally a colorimetric reagent that may be utilized in the detection of iron. Ferrozine may form a complex with ferrous irons (and ferric ions) in the sample that can be quantified by colorimetric detection at 565 nm (or 562 nm) as a measure of iron concentration. The detection may be via the aforementioned UV-Vis spectrophotometer. The addition of the ferrozine may turn the sample (sample mixture) into a purple (or magenta) color.

FIG. 1 is an online UV-Vis spectrophotometer system 10 having an online analyzer that is a UV-Vis spectrophotometer 12 (e.g., FIG. 1A) and a sampling system 14. The system 10 or the spectrophotometer 12 may labeled as an online analytical instrument. In operation, the online UV-Vis spectrophotometer system 10 measures online (performs online analysis of) the total dissolved iron in (of) a fluid (e.g., glycol or amine) flowing through a fluid conduit 16. The conduit 16 can be coupled to or associated with a tower (column) vessel. The conduit 16 may be a glycol conduit that conveys glycol in a natural gas dehydration system. If so, the sampling system 14 collects a glycol sample from the glycol flowing through the conduit 16. On the other hand, the conduit 16 may be an amine conduit that conveys amine (liquid amine) in a gas sweetening unit. If so, the sampling system 14 collects an amine sample of the amine flowing through the conduit 16.

The sampling system 14 has a sample conduit 18 coupled to the fluid conduit 16 to collect the fluid sample (e.g., glycol sample or amine sample) for online analysis of total dissolved iron in the sample by the UV-Vis spectrophotometer 12. A sampling valve 20 may be disposed along the sample conduit 18. A control system 22 (logic) of the spectrophotometer 12 or spectrophotometer system 10 may operate the valve 20 to collect the desired amount (volume) (e.g., 10 ml) of the sample. In other words, collect the desired amount of fluid from the fluid conduit as the sample. The pressure (operating pressure) in the fluid conduit 16 may provide motive force for flow of the fluid sample from the fluid conduit 16 through the sample conduit 18.

The sampling system 14 includes a reagent water vessel 24 storing reagent water (e.g., up to one gallon) that can be deionized water with acid, a ferrozine vessel 26 storing ferrozine (e.g., up to one gallon), a quality control (QC) sample vessel 28 storing a QC sample (e.g., up to one gallon) that is a QC standard (e.g., iron at 2 mg/l in water), and a reference material vessel 30 storing reference material (e.g., up to one gallon). The reference material may be a concentrated certified reference material [e.g., iron ($Fe^{2+}$ and/or $Fe^{3+}$) at 100 mg/l] (e.g., the aforementioned stock solution) for automatic calibration of the analyzer (UV-Vis spectrophotometer 12). The vessels 24, 26, 28, and 30 may each be a container. The inside volume of the vessels 24, 26, 28, and 30 may each be, for example, one gallon. In implementations, one or more of the vessels 24, 26, 28, and 30 may be pressurized to provide motive force for flow (injection) of the respective stored material into the sample. A pump may be employed in addition to (or in lieu of) pressurizing the vessels, In the illustrated embodiment, the sampling system 14 includes a heater cell 32 and a cooler cell 34, which each may have an inside volume, for example, of 100 ml. The cells 32 and 34 may each be a tube or have a tube shape. Further, the UV-Vis spectrophotometer 12 may include a sample cell 36 and a reference cell 38. The cells 36 and 38 may each be, for example, square shape having an inside volume of 10 ml or more.

In operation, a sample (e.g., 10 ml, or in range of 5 ml to 20 ml) of the fluid (e.g., glycol or amine) flowing through the fluid conduit 16 (e.g., glycol conduit or amine conduit) is extracted from the conduit 16 via the sample conduit 18 to the heater cell 32. The reagent water (e.g., 40 ml or in a range of 20 ml to 60 ml) is added from the reagent water vessel 24 to the heater cell 32. As discussed, the reagent water may be, for example, deionized water having $HNO_3$. For heating via the heater cell 32 (e.g., 100-ml tube), the mixture of the sample and reagent water in the heater cell 32 may be refluxed at a specified temperature (e.g., 120° C. or in the range of 110° C. to 130° C.) for a specified time (e.g., 20 minutes or in the range of 10 minutes to 30 minutes). This heated sample mixture of sample and reagent water is transferred (e.g., via a conduit such as tubing) from the heater cell 32 to the cooler cell 34 that cools the sample mixture to a specified temperature (e.g., ambient temperature or 25° C.). In implementations, the cooler cell 34 may have an external shell or jacket to receive cooling water for the cooling. Carbonate (e.g., sodium carbonate, potassium carbonate, etc.) may be added to the cooler cell 34 to adjust (increase) pH of the sample (having the reagent water) to a pH in a range of 7 to 8.5. The aqueous carbonate (e.g., sodium carbonate) added may have a normality (N), for example, of 1 N. A pH sensor may be employed to measure the pH in the cooler cell 34 for the automatic addition of the sodium carbonate.

The sample may be provided to both the sample cell 36 and the reference cell 38 to measure the total dissolved iron content of the collected sample. In particular, the sample (after addition of reagent water and carbonate) may be transferred (e.g., 9.5 ml) from the cooler cell 34 along with ferrozine (e.g., 0.5 ml) from the ferrozine vessel 26, giving a mixture 40 to the sample cell 36 (e.g., having inside volume of 10 ml) in the spectrophotometer 12. The sample (with reagent water and carbonate) may be transferred (e.g., 10 ml) from the cooler cell 34 to the reference cell 38 (e.g., having inside volume of 10 ml) in the spectrophotometer 12. In the analysis, the sample with the developed color in the sample cell 36 is compared to the sample without the ferrozine in the reference cell 38. This may account for the absorbance of developed color of the sample with the reagent ferrozine versus the sample without the reagent ferrozine.

Figure 2:
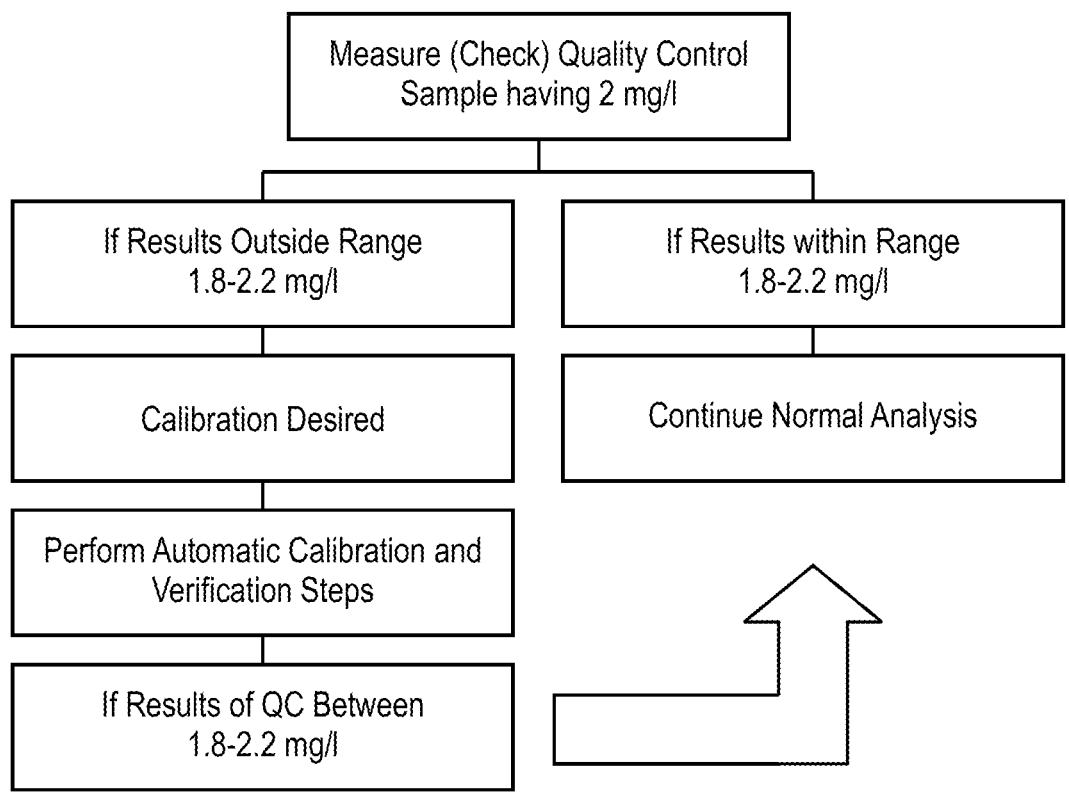
FIG. 2 is a diagram of a method of calibrating a UV-Vis spectrophotometer.

The reference cell 38 is utilized periodically for verification/calibration, see, e.g., FIG. 2. As discussed below with respect to the calibration, and as indicated by reference numeral 42, a QC sample (e.g., 10 ml of the QC sample that has 2.0 mg/l of total iron) from the QC sample vessel 28 may be added to the reference cell 38, or alternatively, reference material (e.g., 10 ml of the reference material as each prepared standard, respectively) from the reference material vessel 30 may be added to the reference cell 38. As depicted, an autosampler 44 (e.g., having a pump) may be employed. The QC sample may be, for example, 2 mg/l of total iron in water (e.g., ultrapure water) or 2 ppmv. The water in the QC sample may have $HNO_3$? The QC sample may be a ready-made standard with known concentration (here, for example, 2 mg/l of total iron) utilized to verify that the instrument calibration remains valid in that the reported values are correct. For 2 mg/l, if the calibration check using the QC sample gave values outside a specific range, for example, of 1.8-2.2 mg/l of iron, the analyzer may undergo for full calibration by preparing different sets of standard by dilution technique from the provided reference stock solution 100 mg/l and conduct the calibration. As mentioned, the reference material may be a concentrated certified reference material, such as having concentration 100 mg [$Fe^{2+}$ and/or $Fe^{3+}$] per liter (the aforementioned iron standard) for automatic calibration of the analyzer (UV-Vis spectrophotometer 12). The liquid in the reference material is acidified ultrapure water with nitric acid for the reference iron standard.

Figure 1A:
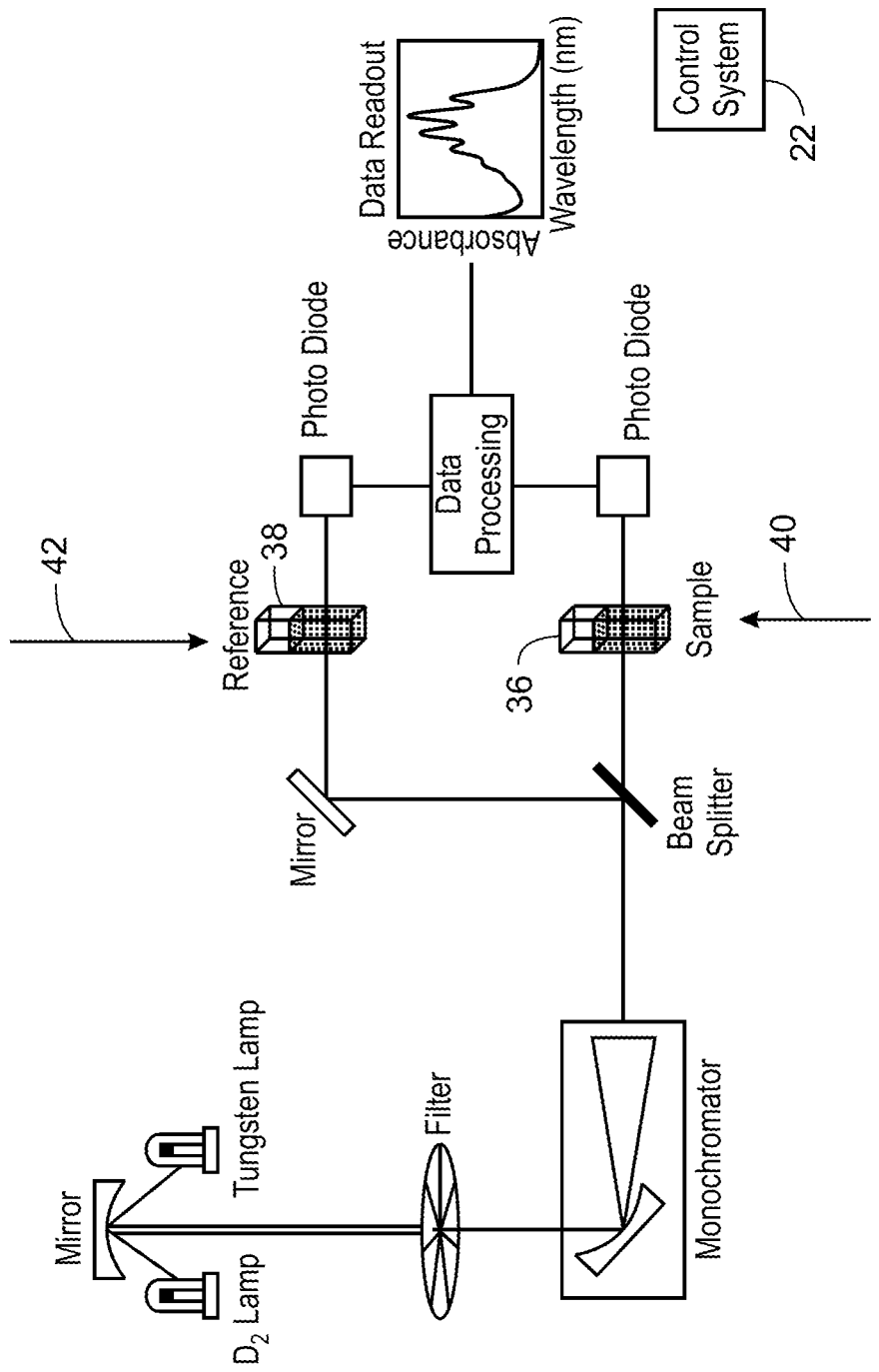
FIG. 1A is a diagram of the UV-Vis spectrophotometer of FIG. 1

FIG. 1A is an example of the UV-Vis spectrophotometer 12 of FIG. 1, as would be appreciated by one of ordinary skill in the art. The UV-Vis spectrophotometer 12 instrument can have a control system 22 that may be a computing processor and memory storing code (logic, instructions) executed by the processor for operation of the spectrophotometer 12. The control system 22 (via the processor and executed code) can provide for the depicted data processing, and may generally provide for a user interface. The instrument memory can typically store data. The computing processor as directed by the executed code may act as a controller to generally run the UV-Vis spectrophotometer 12 instrument including instructing the spectrophotometer 12 on handling of samples and reference material, scanning and scanning program, interfacing with a facility control system (e.g., DCS), and so on.

As for measurements performed (measuring procedure) by the UV-Vis spectrophotometer 12, the treated sample from the heater cell 34 (FIG. 1) may be distributed to the two cells 36, 38 (e.g., 10 ml square shape cells) of the UV-Vis spectrophotometer 12 analyzer. As discussed, ferrozine reagent (e.g., 0.5 ml) may be added to the sample cell 36. Ferrozine is typically not added to the reference cell 38. The reference cell 38 may receive the treated sample from the sample pre-treatment steps through the autosampler 44 (FIG. 1). The scanning program may run, for instance, from 700 nm until 200 nm. The peak detection may generally be at 565 nm. The instrument beam may go through both cells 36, 38 during the sample analysis with the detector subtracting the reference beam absorbance to give the final concentration. (During QC and/or calibration, the beam will go through the reference cell 38 as single beam determination, and not the sample cell 36.)

The iron concentration may be automatically detected, for example, via a built-in calibration curve. The total dissolved iron concentration measured may be multiplied by a factor (e.g., 5) to compensate for the dilution in the pre-treatment steps. The results may be transferred to an operation control system [e.g., distributed control system (DCS)] at the NG processing facility. The autosampler 44 may go to a flushing mode with water (e.g., acidified distilled water, reagent water, etc.) to rinse the reference cell 38 and the sample cell 36. While not expressly depicted in FIGS. 1-1A for clarity, the autosampler 44 may be in fluid communication with the sample cell 36. The sample cell 38 be coupled with the autosampler pump (e.g., peristaltic pump or separate pump) starts when the autosampler 44 starts the flushing step. The flushing of the fluid from the reference and sample cells may discharge to a container with the contents to be disposed.

FIG. 2 is a method of calibrating the UV-Vis spectrophotometer analyzer (e.g., the online UV-Vis spectrophotometer 12 of FIG. 1). The method may be labeled as analyzer characterization and verification procedure. To check for need for calibration, as depicted in FIG. 2, the method may check (measure) a QC sample for total dissolved iron. The QC sample may be, for instance, the aforementioned QC sample having 2 mg/l of iron. The verification of FIG. 2 may be performed by the UV-Vis spectrophotometer periodically or at intervals, for example, at conclusion of a specified number of runs (e.g., 20 runs) of normal measurements of a collected sample by the UV-Vis spectrophotometer system.

For the verification, if the initial check (measurement) of the QC sample gives measurement results within a specified acceptable range (e.g., within 1.8-2.2 mg/l of iron for the QC sample having 2 mg/l of iron), then calibration is generally not performed and the normal analysis may continue.

On the other hand, if the results of the measurement of the QC sample are outside of the specified acceptable range (e.g., 1.8-2.2 mg/l of iron), then calibration may be performed by the UV-Vis spectrophotometer utilizing a certified reference material (CRM) (e.g., 100 mg/l of iron). For the spectrophotometer operating online, a human operation team may be alerted (e.g., via a message received at the DCS from the online UV-Vis spectrophotometer) that the calibration is in progress. The UV-Vis spectrophotometer may automatically perform the calibration and verification steps. Such may be performed until the measurement results of a QC sample are within the specified acceptable range (e.g., 1.8-2.2 mg/l of iron for the QC sample having 2 mg/l of iron), and then normal analysis (not calibration) may be performed (may continue) with the UV-Vis spectrophotometer.

The calibration may include the following. An autosampler may prepare standards (e.g., four standards) from the CRM and read them through the UV-Vis spectrophotometer analyzer. A blank that is reagent water taken by the autosampler may be measured. To prepare the standards (e.g., 1 mg/l, 2 mg/l, 5 mg/l of iron), the autosampler may take CRM (e.g., 0.5 ml) and dilute the with reagent water (e.g., up to 50 ml) and then follow the steps of the measuring procedure above discussed above with respect to FIG. 1A. The steps are repeated for each standard. After calibration is completed, another QC sample (e.g., 2 mg/l of iron) may be analyzed to confirm the accuracy. The desired accuracy may be that measure fall within the specified acceptable range (e.g., 1.8-2.2 mg/l of iron). After calibration and verification completed, another message may be transferred to DCS from the UV-Vis spectrophotometer indicating that the UV-Vis spectrophotometer is back to normal measuring mode.

A natural gas (NG) processing plant or facility (onshore or offshore) may receive feed natural gas including raw natural gas produced from a subterranean formation. Embodiments include operating the NG processing plant to remove components (e.g., acid gas, water, hydrocarbons, etc.) from the feed natural gas to give natural gas as product. A NG processing plant may be a facility that "cleans" raw natural gas by separating impurities including non-methane hydrocarbons and other fluids to produce product natural gas or what may be known as 'pipeline quality' dry natural gas. The NG processing plant employs multiple systems/units and unit operations to process the natural gas.

Figure 3:
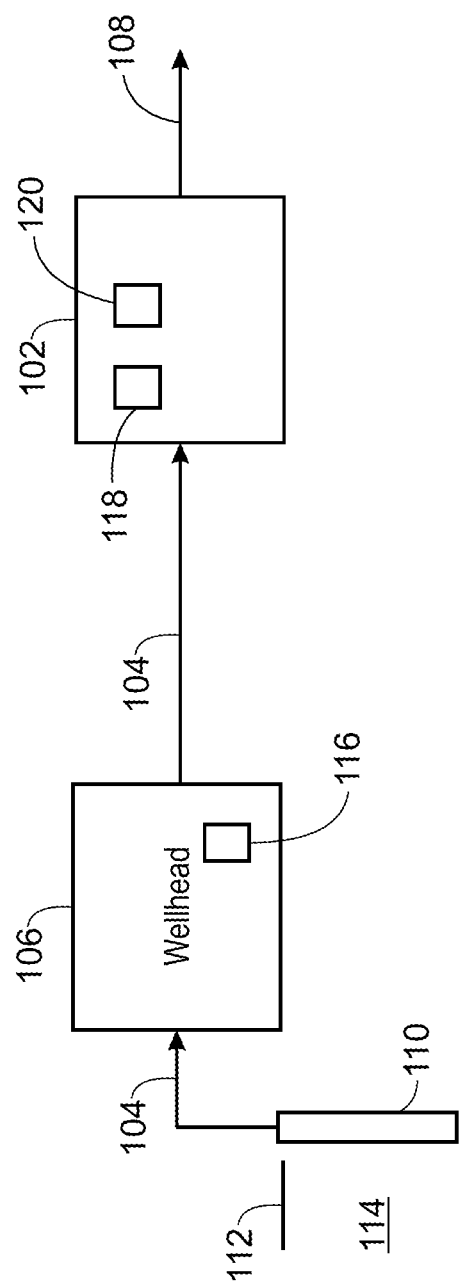
FIG. 3 is a diagram of a system for producing natural gas.

FIG. 3 is a system 100 for producing natural gas including a NG processing plant 102 that receives feed natural gas 104 via an inlet conduit (supply conduit) from a wellhead 106 (or multiple wellheads 106) or from a wellhead system. The inlet conduit conveying the feed gas 104 from the wellhead 106 to the NG processing plant 102 may be known as a natural gas pipeline. The NG processing plant 102 may discharge product natural gas 108 via an outlet conduit (discharge conduit) for distribution to users.

In implementations, the natural gas 104 may be characterized as a feed stream (e.g., a main feed stream) from a producing well or multiple producing wells to a NG processing plant. The NG processing plant 102 may be in fluid communication with the wellhead 106 for receipt of the feed natural gas 104 from the wellhead 106. In certain implementations of the provision of the feed natural gas 104 to the NG processing plant 102, the wellhead 106 and the NG processing plant 102 may act in concert as a continuous operation.

In implementations, the wellhead 106 pressure may provide motive force for flow of the natural gas 104 to the NG processing plant 102. In some implementations, a mechanical compressor (not shown) can be disposed along the natural gas pipeline to provide motive force (e.g., as a supplement to the wellhead 106 pressure) for flow of the natural gas 104 from the wellhead 106 to the NG processing plant 102. Similarly, a mechanical compressor can be disposed along the outlet conduit to provide motive force for flow of the treated natural gas 108 (product) to users.

Vessels (e.g., knockout pots, such as in compressor stations) may be disposed along the natural gas pipeline conveying the feed natural gas 104 to remove liquid (e.g., water) from the feed natural gas 104. Filters (e.g., coreless filters or a filter housing having internal filter cartridges or filter bags, etc.) along the pipeline (e.g., near or at the entry to the NG processing plant 102) may remove black powder that forms in the pipeline.

In certain implementations, the natural gas 104 received from the wellhead 106 may be sour natural gas having acid gas. Acid gas may be primarily $H_2S$ and $CO_2$, and can include similar acidic gases.

The NG processing plant 102 processes the feed natural gas 104 for distribution of product natural gas 108 to downstream users. The NG processing plant 102 may receive and purify the feed natural gas 104, and discharge pipeline quality dry natural gas as product natural gas 108 for end users. The natural gas used by consumers is typically composed almost entirely of methane.

The natural gas 104 produced through the wellhead 106 and through the inlet conduit to the natural gas processing plant 102 may include primarily methane ($CH_4$), for example, in the range of 55 volume percent (vol %) to 85 vol %. The natural gas 104 may include higher alkanes (e.g., ethane, propane, butane) and other components (e.g., acid gas, water vapor, nitrogen, etc.).

In some implementations, the flow rate (e.g., volumetric rate, mass rate, or molar rate) of the natural gas 104 fed to the NG processing plant 102 may be controlled via at least one flow control valve disposed along the inlet (supply) conduit or by a mechanical compressor, or a combination thereof. In implementations, the supply pressure of the feed natural gas 104 may provide for or facilitate the operating pressure of the gas 104 at the inlet portion of the NG processing plant 102.

The system 100 may include a gas well (or oil and gas well) having the wellhead 106 coupled to a wellbore 110 formed through the Earth surface 112 into a subterranean formation 114. The natural gas 104 may be produced from the subterranean formation 114 through the wellbore 110 to the wellhead 106. For the wellbore 106 as a cemented cased wellbore, the natural gas 104 may flow into the wellbore 106 from the subterranean formation 114 through perforations in the cement and the casing.

The natural gas 104 as produced from the formation 114 and discharged from the wellbore 110 to the wellhead 106 may have liquid (e.g., crude oil, condensate, water, etc.). In those instances, liquid can be removed from the natural gas 104 at or near the wellhead 106 in certain implementations. A separator 116 at the wellhead 106 may be employed to separate liquid from the natural gas 104. In some examples, the separator 116 may include a vessel or piping for separation of liquid from the natural gas. Water vapor may remain in the natural gas 104 and be separated, for instance, at the downstream NG processing plant 102 via dehydration (e.g., glycol dehydration).

In certain examples, the natural gas 104 and the produced liquid may separate due to decreased pressure at the wellhead 106. In these cases, the separator 116 may be a vessel, such as a closed tank, where gravity serves to separate the liquid and natural gas 104. In examples, the separator 116 may be a low-temperature separator (LTX) that may include a heat exchanger, a choke to expand the gas, and liquid knockout vessel to separate liquid from the natural gas 104.

The natural gas 104 may flow from the wellhead 106 through a production manifold associated with one or more wellheads to the inlet conduit to the NG processing plant 102. The natural gas 104 received at the NG processing plant 102 may be from a well pool. In implementations, the natural gas 104 received at the NG processing plant 102 can be characterized as raw natural gas as produced from the subterranean formation 110 and that has been subjected to little or no processing.

While the discussion herein has focused on natural gas 104, the stream 104 may instead be a methane stream (e.g., having $H_2S$ or acid gas, hydrocarbons in addition to methane, etc.). Sources of methane can include, for example, biogas or landfill gas. In general, the stream 104 as a methane stream can be a process stream or waste stream, or a stream from methane storage. As for storage supply, instead of a producing well having a wellhead 106 as the source of the stream 104, the source may be methane stored in refrigerated containers or methane stored in ground through gas reinjection, such as in a mined salt cavern or other subterranean formation.

Lastly, the NG processing plant 102 may include an acid gas removal system 118 that is a gas sweetening unit utilizing liquid amine to treat the feed natural gas 104. A UV-Vis spectrophotometer may be employed to measure total dissolved iron in the liquid amine. In implementations, the UV-Vis spectrophotometer can be employed as an online analytical instrument to measure online (perform online analysis of) the total dissolved iron in the liquid amine. The NG processing plant 102 may include a NG dehydration system 120 utilizing glycol as liquid desiccant to remove water (e.g., moisture, water vapor) from the feed natural gas 104. A UV-Vis spectrophotometer may be employed to measure total dissolved iron in the glycol. In implementations, the UV-Vis spectrophotometer can be employed as an online analytical instrument to measure online (perform online analysis of) the total dissolved iron in the glycol.

Figure 4:
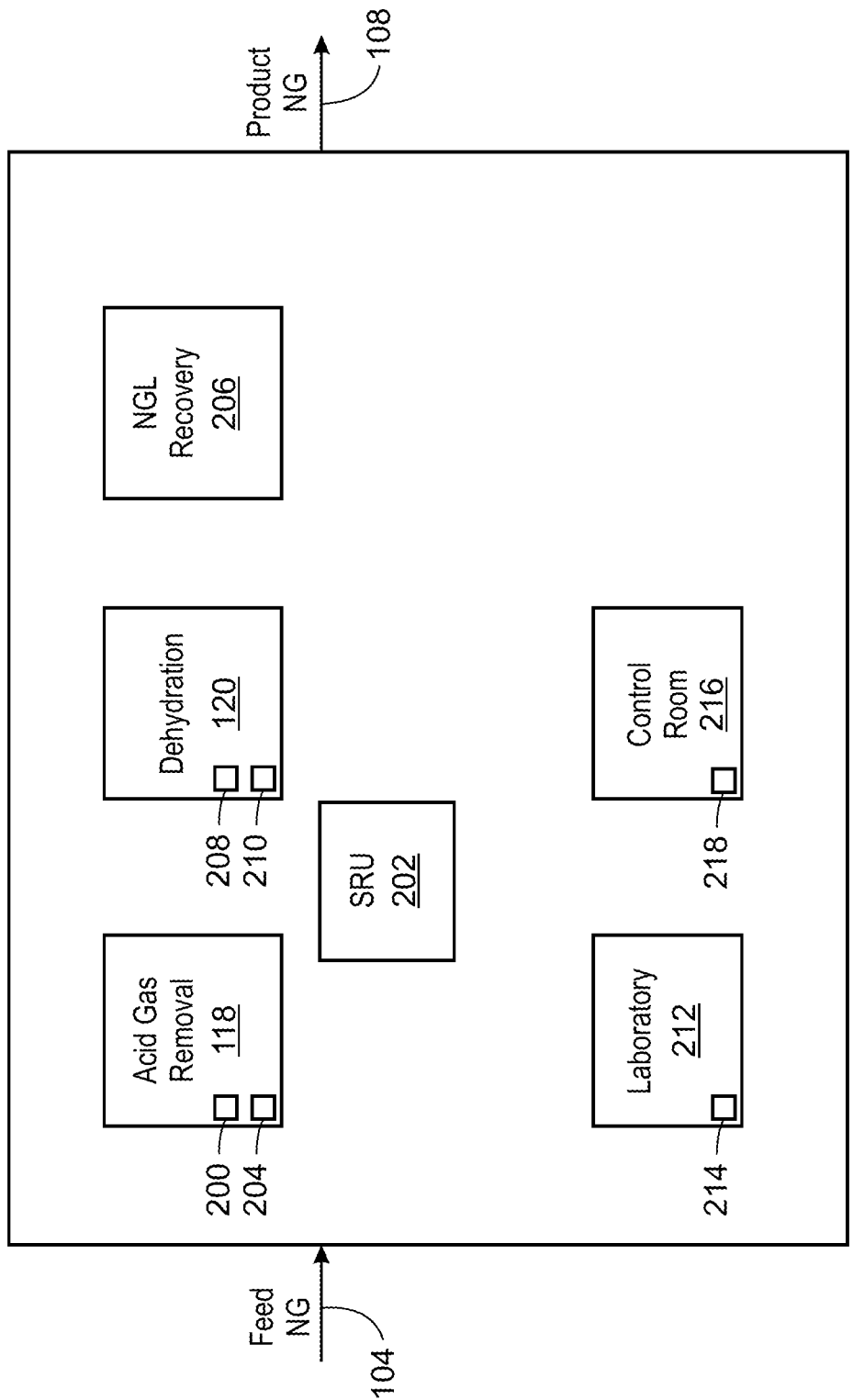
FIG. 4 is a diagram of the natural gas processing plant of FIG. 3.

FIG. 4 is an example of the NG processing plant 102 that receives the feed natural gas 104. In operation, the NG processing plant 102, after processing the feed natural gas 104 via the acid gas removal system 118, dehydration system 120, and NGL recovery 206 (and additional processing), discharges the processed feed natural gas as product natural gas 108.

At the inlet portion of the NG processing plant 102, the feed natural gas 104 may be subjected to initial processing. For instance, at the inlet portion of the NG processing plant 102, hydrocarbon condensate or liquid water may be removed from the feed natural gas 104, such as via knockout pots or other vessels.

In the NG processing plant 102, the feed natural gas 104 may be subjected to acid gas removal to remove acid gas including $H_2S$ and carbon dioxide. The acid gas may be removed from the feed natural gas 104 in an acid-gas removal system 118 having a vessel 200 to remove the acid gas. The acid-gas removal system 118 can be an amine treating unit, Benfield process, Sulfinol® process, or pressure swing adsorption (PSA) unit, and the like.

An acid-gas removal system 118 as an amine treatment unit is a sweetening unit (e.g., amine treatment) to treat natural gas 104 (e.g., with a liquid amine solution) in a vessel 200 (e.g., a tower) to remove $H_2S$ from the fee natural gas 104. The vessel 200 may be an absorber, contactor, absorber column, contactor tower, etc. In operation, the vessel 200 contacts the feed natural gas 104 with the liquid amine to absorb the acid gas from the feed natural gas 104 into the liquid amine.

The sweetening unit (gas sweetening unit) may receive the feed natural gas 104 as sour natural gas and discharge the feed natural gas 104 as sweet natural gas ("sweet gas"). Again, in implementations, the liquid amine absorbs hydrogen sulfide ($H_2S$) from the feed natural gas 104. See, for example, FIG. 5. In implementations, the acid-gas removal system 118 as a gas sweetening unit has a UV-Vis spectrophotometer 204 to measure total dissolved iron in the liquid amine. In some implementations, the UV-VIS spectrophotometer 204 can be an online analytical instrument that performs online analysis of the total dissolved iron in the liquid amine. The liquid amine can be sampled from the vessel 200, from a conduit conveying liquid amine to the vessel 200, or from a conduit conveying liquid amine from the vessel 200, or elsewhere in the gas sweetening system as the acid gas removal system 118.

The acid gas removed by the acid gas removal system 118 can be sent to a sulfur recovery unit (SRU) 202. In certain instances, hydrogen sulfide can be considered a precursor to elemental sulfur. Sulfur recovery may refer to conversion of $H_2S$ to elemental sulfur, such as in an SRU 200, e.g., Claus system. The most prevalent technique of sulfur recovery is the Claus system, which may be labeled as the Claus process, Claus plant, Claus unit, and the like. The Claus system includes a thermal reactor (e.g., a furnace) and multiple catalytic reactor vessels to convert $H_2S$ into elemental sulfur that is removed (recovered).

The feed natural gas 104 (as sweet gas from the acid gas removal system 118) may be subjected to dehydration in the dehydration system 120 (NG dehydration system). In operation, the dehydration system 120 removes water (moisture, water vapor, and/or liquid water) from the feed natural gas 104. The dehydration system 120 has a vessel 208 (e.g., absorber column) to facilitate removal of water from the feed natural gas 104. In implementations, the dehydration system 120 is a glycol dehydration unit that removes water from the feed natural gas 104. A glycol dehydration unit has the vessel 208 as an absorber column (e.g., having packing) in which glycol, e.g., triethylene glycol (TEG), as a liquid desiccant absorbs water from the natural gas 104. See, for example, FIG. 6. The absorber column may also be called a contactor column or contactor tower.

The NG dehydration system 120 employing glycol as a liquid desiccant to remove water in an absorber column (contactor tower) vessel 208 may utilize a UV-VIS spectrophotometer 210 to measure total dissolved iron in the glycol. In some implementations, the UV-VIS spectrophotometer 204 can be an online analytical instrument that performs online analysis of the total dissolved iron in the glycol. The liquid amine can be sampled from the vessel 208, from a conduit conveying glycol to the vessel 200, or from a conduit conveying glycol from the vessel 200, or elsewhere in the dehydration system 120.

The feed natural gas 104 (e.g., as processed through dehydration as dehydrated sweet gas from the dehydration system 204) may be subjected to NGL recovery 206 in which natural gas liquids (NGL) are removed (e.g., by refrigeration or absorption) from the feed natural gas 104 in a NGL recovery system (e.g., having a vessel to remove the NGL). Natural gas liquids (NGL) are components of natural gas that are separated from the gas state in the form of liquids. There are several types of natural gas liquids and different applications for NGL as products. Separating the NGL from the feed natural gas 104 can facilitate making for a cleaner, purer natural gas as product natural gas 108 that is pipeline ready for commercial, electric power, residential, and industrial use. The NGL removal can be implemented via cryogenic turboexpander recovery, mechanical refrigeration or cryogenic refrigeration (without expansion), absorption, etc. For instance, in absorption, an absorbing oil that has an affinity for NGL may be utilized in a vessel (e.g., absorption tower) to separate NGL from the natural gas. The oil laden with NGL may then be heated above the NGL boiling points to separate the NGL from the oil. The cryogenic techniques may decrease the temperature of the natural gas, for example, to about minus 120° F. At this temperature, the NGL condenses out of the feed natural gas 104 giving a methane stream or a methane-rich stream (e.g., greater than 99 vol % methane).

The NGL includes non-methane hydrocarbons, such as ethane, propane, butanes [normal butane (n-butane) and isobutane (i-butane)], pentanes, and heavier hydrocarbons (e.g., C6-C9). A mix of the pentanes and the heavier hydrocarbons can be characterized as natural gasoline. Liquid petroleum gas (LPG) that can be described as a blend of propane, n-butane, and i-butane. The NGL removed from the feed natural gas 104 may be subjected to fractionation (e.g., in a train of multiple distillation column vessels) to separate the NGL into respective hydrocarbons to be useful as individual products external of the NG processing plant 102. The train may start with the separation of lighter NGL components from the NGL removed from the feed natural gas 104. An example train is in the following order: deethanizer column (separate ethane), depropanizer column (separate propane), and debutanizer column (separate butanes), leaving the pentanes and heavier hydrocarbons in the NGL stream. A butane splitter column or deisobutanizer column may separate the isobutane and the normal butane.

The NG processing plant 102 may have a laboratory 212 (one or more laboratories 212). The laboratory 212 can be associated with a single individual unit or process system, or can be a centralized laboratory associated with multiple units or process systems. The laboratory 212 may have a UV-Vis spectrophotometer 214 to measure total dissolved iron in a sample of liquid amine manually collected from the acid gas removal system 118 (gas sweetening unit) and/or in a sample of glycol manually collected from the dehydration system 120. The control room 216 and/or other building in the NG processing plant 102 may have a UV-Vis spectrophotometer to perform such measurements.

The control room 216 (one or more control rooms 216) can be associated with a single individual unit or process system, or can be a centralized control room associated with multiple units or process systems. The control room 216 may include a control system 218 to facilitate or direct operation of the acid gas removal system 118 and/or the NG dehydration system 120. The operation directed may include supply or discharge of flow streams (including flow rate) and associated control valves, control of operating temperatures and operating pressures, and control of absorption columns, distillation columns, and heat exchangers, and so on. The control system 218 (e.g., DCS) in the control room 212 may receive data from the control system (e.g., 22 of FIGS. 1-1A) of the UV-Vis spectrophotometer 204, 210 in the acid gas removal system 118 and the dehydration system 120.

The control system 218 in the control room 216 may include a processor and memory storing code (e.g., logic, instructions, etc.) executed by the processor to perform calculations and direct operations. The control system 218 may be or include one or more controllers. The processor (hardware processor) may be one or more processors and each processor may have one or more cores. The hardware processor(s) may include a microprocessor, a central processing unit (CPU), a graphic processing unit (GPU), a controller card, circuit board, or other circuitry. The memory may include volatile memory (e.g., cache and random access memory), nonvolatile memory (e.g., hard drive, solid-state drive, and read-only memory), and firmware. The control system 218 may include a desktop computer, laptop computer, computer server, programmable logic controller (PLC), distributed computing system (DSC), controllers, actuators, or control cards. The control system 218 may include control modules and apparatuses distributed in the field.

The control system 218 may receive user input that specifies the set points of control devices or other control components in the units or process systems (e.g., acid gas removal system 118 and/or the NG dehydration system 120). The control system 218 typically includes a user interface for a human to enter set points and other targets or constraints to the control system 218. In some implementations, the control system 218 may determine, calculate, and specify the set point of control devices. The determination can be based at least in part on the operating conditions of the process systems including feedback information from sensors and transmitters, and the like.

Some implementations of the control room 216 may be a center of activity, facilitating monitoring and control of the process or facility. The control room 216 may contain a human machine interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data. The control system may also employ local control (e.g., distributed controllers, local control panels, etc.) distributed in the process systems.

Figure 5:
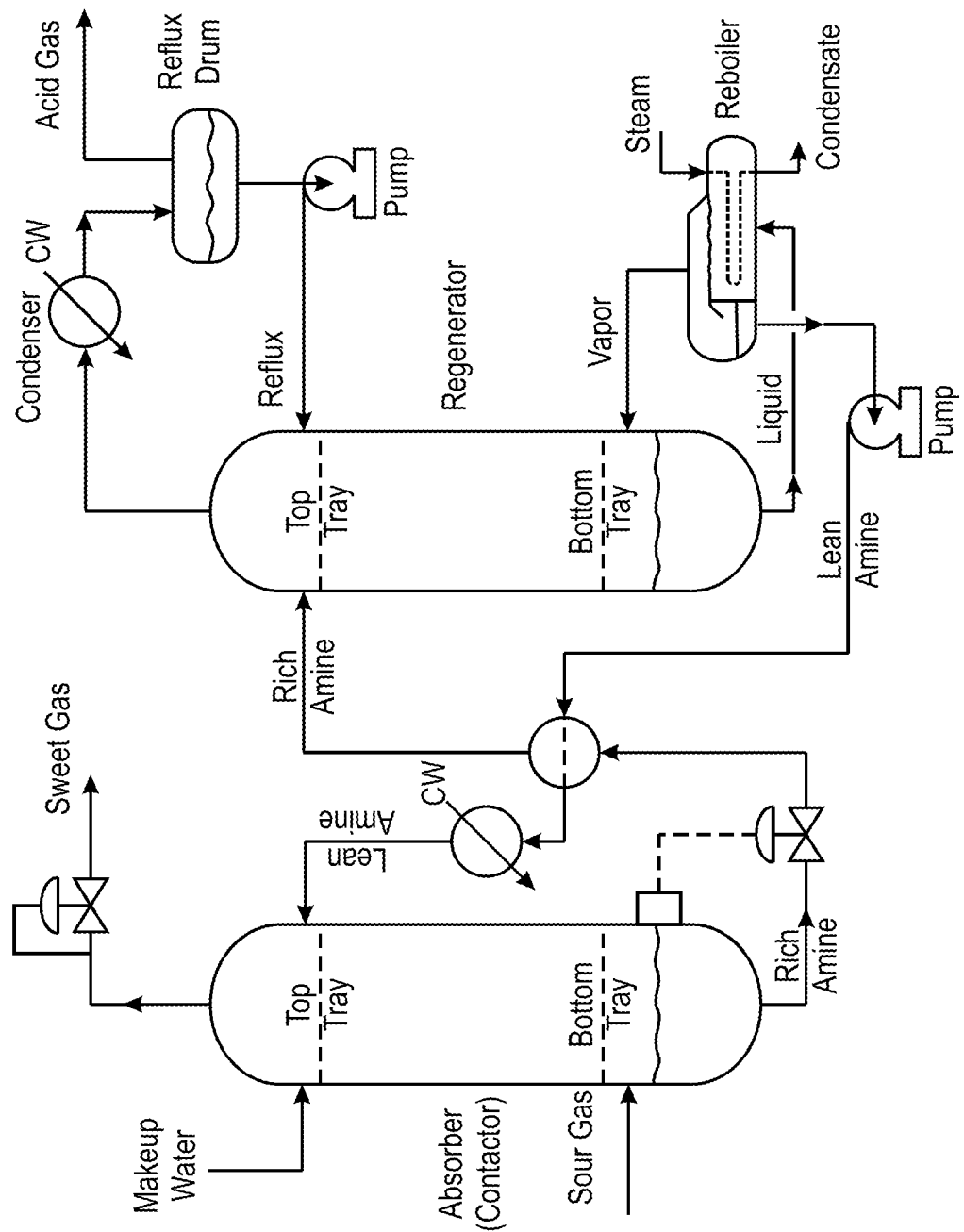
FIG. 5 is a diagram of a gas sweetening system.

FIG. 5 is an example of a gas sweetening unit (gas sweetening system) that implements amine gas treatment (amine gas treating), also known as amine scrubbing, gas sweetening, and acid gas removal. The gas sweetening unit may be implemented as the acid gas removal 118 system of the NG processing plant 102 of FIGS. 3-4.

Liquid amine samples for analysis of total dissolved iron via a UV-Vis spectrophotometer may be collected from the absorber column (contactor tower), from piping conveying lean amine to the absorber column, or from piping conveying rich amine from the absorber column. The liquid amine samples may be manually collected, such as by a human via a manual valve. The liquid amine samples may be automatically collected via an automatic sampling system for the UV-Vis spectrophotometer system as an online analytical instrument having the automatic sampling system. As discussed below, the absorber column may contact the feed natural gas 104 (FIGS. 3-4) as entering sour gas with liquid amine to absorb acid gas from the feed natural gas 104 into the liquid amine to remove the acid gas from the feed natural gas 104.

In implementations such as FIG. 5, the feed natural gas 104 may be fed to the gas sweetening unit. The system depicted in FIG. 5 employs an aqueous solution of an alkylamine(s) (referred to as amine) to remove $H_2S$ and $CO_2$ from sour gas, such as the feed natural gas 104. Gas sweetening units are utilized in NG processing plants, petroleum refineries, petrochemical plants, and other industries. Amines utilized in the gas sweetening unit may include diethanolamine (DEA), monoethanolamine (MEA), methyldiethanolamine (MDEA), diisopropanolamine (DIPA), and aminoethoxyethanol (Diglycolamine) (DGA). Amines commonly employed are the alkanolamines DEA, MEA, and MDEA.

The feed natural gas 104 having $H_2S$ (and $CO_2$) is fed to and treated in the sweetening unit to remove the $H_2S$ (and the $CO_2$). The chemistry in the amine treating may vary in particular with the amine. As an example, for MEA denoted as $RNH_2$, the acid-base reaction involves protonation of the amine electron pair to form a positively charged ammonium group $RNH_3^+$, and which can be represented by $RNH_2 + H_2S \leftrightarrows RNH_3^+ + HS^-$ and $RNH_2 + H_2CO_3 \leftrightarrows RNH_3^+ + HCO_3^-$. The resulting dissociated and ionized species being more soluble in solution are scrubbed by the amine solution and thus removed from the gas phase. At the outlet of the absorber column (contactor tower, amine scrubber, etc.), the gas as sweetened ("sweet gas") is thus depleted in $H_2S$ and $CO_2$.

The system depicted in FIG. 5 is only an example of a typical amine gas treating process and includes the absorber column (also called contactor) and a regenerator distillation column. The sour gas (feed natural gas 104) (e.g., having 5-30 vol % acid gas) enters a bottom portion of the absorber column (vessel) and flows upward through the absorber column. An aqueous solution of amine enters a top portion of the absorber column and flows downward through the absorber column in a countercurrent direction with respect to the sour gas flowing upward. This amine solution that enters the absorber column may be labeled as lean amine in having little or no acid gas. The absorber column may have trays as indicated, or may have packing, to provide surface area for contact of the lean amine with the sour gas and thus give mass transfer stages for absorption of acid gas from the sour gas into the lean amine. Sweet gas having little or no acid gas discharges overhead from the absorber column for further processing or handling in the NG processing plant. Rich amine (rich in acid gas by having the acid gas absorbed from the sour gas) discharges from a bottom portion of the absorber column. In the illustrated example, a liquid level of the rich amine solution may be maintained in the bottom portion of the absorber column via a bottoms control valve and a level sensor.

The rich amine may flow to the regenerator (regenerator distillation column) that removes the acid gas from the rich amine to discharge the lean amine from a bottom portion of the regenerator. The removed acid gas may discharge overhead from the regenerator and be partially condensed. Reflux may be sent via a reflux drum (vessel) and a reflux pump (e.g., centrifugal pump) to the regenerator. Acid gas ($H_2S$ and $CO_2$) may discharge from the system as gas from the vapor space of the reflux drum. The acid gas may be sent, for instance, to the SRU 202 (e.g., Claus process system) of FIG. 4, in which the $H_2S$ is converted to elemental sulfur.

The lean amine discharges from a bottom portion of the regenerator. The regenerator includes a steam reboiler to vaporize a portion of the lean amine for return to the regenerator. The lean amine is pumped through a cross exchanger (cooled by the rich amine) and a cooler heat exchanger (e.g., cooling water is cooling medium) for supply to the absorber column.

Figure 6:
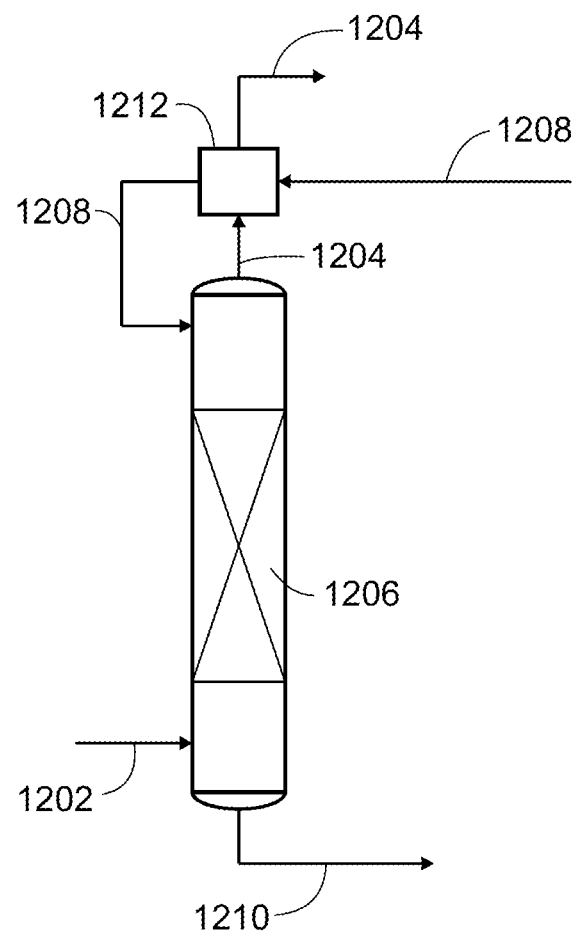
FIG. 6 is a diagram of a contactor column (absorber column) that dehydrates natural gas with a liquid desiccant, such as glycol.

FIG. 6 is a contactor column 1200 (absorber column) that dehydrates natural gas 1202 with a liquid desiccant, such as glycol. The glycol may be triethylene glycol (TEG). The natural gas 1202 can be feed natural gas 104, such as the feed natural gas 104 after being processed in the acid removal system 118 (FIGS. 3-4). The contactor column 1200 may be part of a NG dehydration system (e.g. dehydration system 204 of FIGS. 3-4) in a NG processing plant. The contactor column 1200 may receive natural gas from a gas sweetening unit. The dehydration system having the contactor column 1200 may be employed when the natural gas has moisture (water).

Glycol samples (e.g., TEG samples) for analysis of total dissolved iron via a UV-Vis spectrophotometer may be collected from the contactor column 1200, from piping conveying lean TEG 1208 to the contactor column 1200, or from piping conveying rich TEG 1210 from the contactor column 120. The glycol samples may be manually collected, such as by a human via a manual valve. The glycol samples may be automatically collected for the UV-Vis spectrophotometer as an online analytical instrument having or associated with an automatic sampling system. As discussed below, the contactor column 1200 may contact the feed natural gas 104 (FIGS. 3-4) with glycol (TEG) to absorb moisture from the feed natural gas 104 into the TEG to remove the water from the feed natural gas 104.

In operation, the contactor column 1200 receives wet natural gas 1202, and contacts the natural gas 1202 with TEG as liquid desiccant for the TEG to absorb water from the natural gas 1202. A TEG regeneration system (not shown) regenerates (removes water from) the TEG (rich TEG discharged from the column 1200) to give dried (lean) TEG for re-use as the absorbing TEG in the contactor column 1200.

The contactor column 1200 is a vessel that is an absorption column. The contactor column 1200 employs the TEG to remove (absorb) water from the natural gas 1202 to give the dehydrated (dried) natural gas 1204. The contactor column 1200 may also be called a contactor tower, absorber, absorber column, absorption column, dehydrator, dehydrator column, glycol contactor, glycol contactor column, TEG contactor column, and so forth. The contactor column 1200 utilizes the TEG to dehydrate the natural gas 1202 to give dehydrated natural gas 1204 as product for distribution or further processing in the natural gas processing plant. As denoted by reference numeral 1206, the contactor column 1200 may include column trays (e.g., bubble cap traps, sieve trays, etc.) or packing (e.g., random packing or structured packing) to provide mass-transfer stages and surface area for absorption of water by the TEG from the natural gas.

The natural gas 1202 (e.g., feed natural gas 104 from a gas sweetening unit) entering the contactor column 1200 may flow upward through the contactor column 1200. The contactor column 1200 may receive lean TEG 1208 into an upper portion of the contactor column 1200. The term "lean" means that the TEG is lean in water and may have less than 1 wt % water. The contactor column 1200 may receive the lean TEG 1208 from a TEG regeneration still column (not shown). The lean TEG 1208 entering the contactor column 1200 may flow downward through the contactor column 1200. Thus, the natural gas and TEG may be in a counter current flow with respect to each other in the contactor column 1200 for the absorption of water from the natural gas into the TEG. The dehydrated natural gas 1204 may discharge overhead from the contactor column 1200 through a discharge conduit. In implementations, the dehydrated natural gas 1204 may have a concentration of water less than 7 pounds per million standard cubic feet. Rich TEG 1210 may discharge through a discharge conduit from a bottom portion of the contactor column 1200. The term "rich" means that the TEG is rich in water, such as saturated (or approaching saturation) in water. The rich TEG 1210 may have a concentration of water of at least 2 weight percent (wt %), such as in a range of 2 wt % to 6 wt %. The rich TEG may be sent to the regeneration system for removal of water to give lean TEG for return to the contactor column 1200. Lastly, prior to the lean TEG 1208 entering the contactor column 1200, the lean TEG 1208 may be cooled in a heat exchanger 1212 (cross-exchanger) with the product (dehydrated) natural gas 1204 discharging overhead from the contactor column 1200 as the cooling medium. The heat exchanger 1212 may be a shell-and-tube heat exchanger, a plate-fin heat exchanger, a jacketed-pipe heat exchanger, etc.

Figure 7:
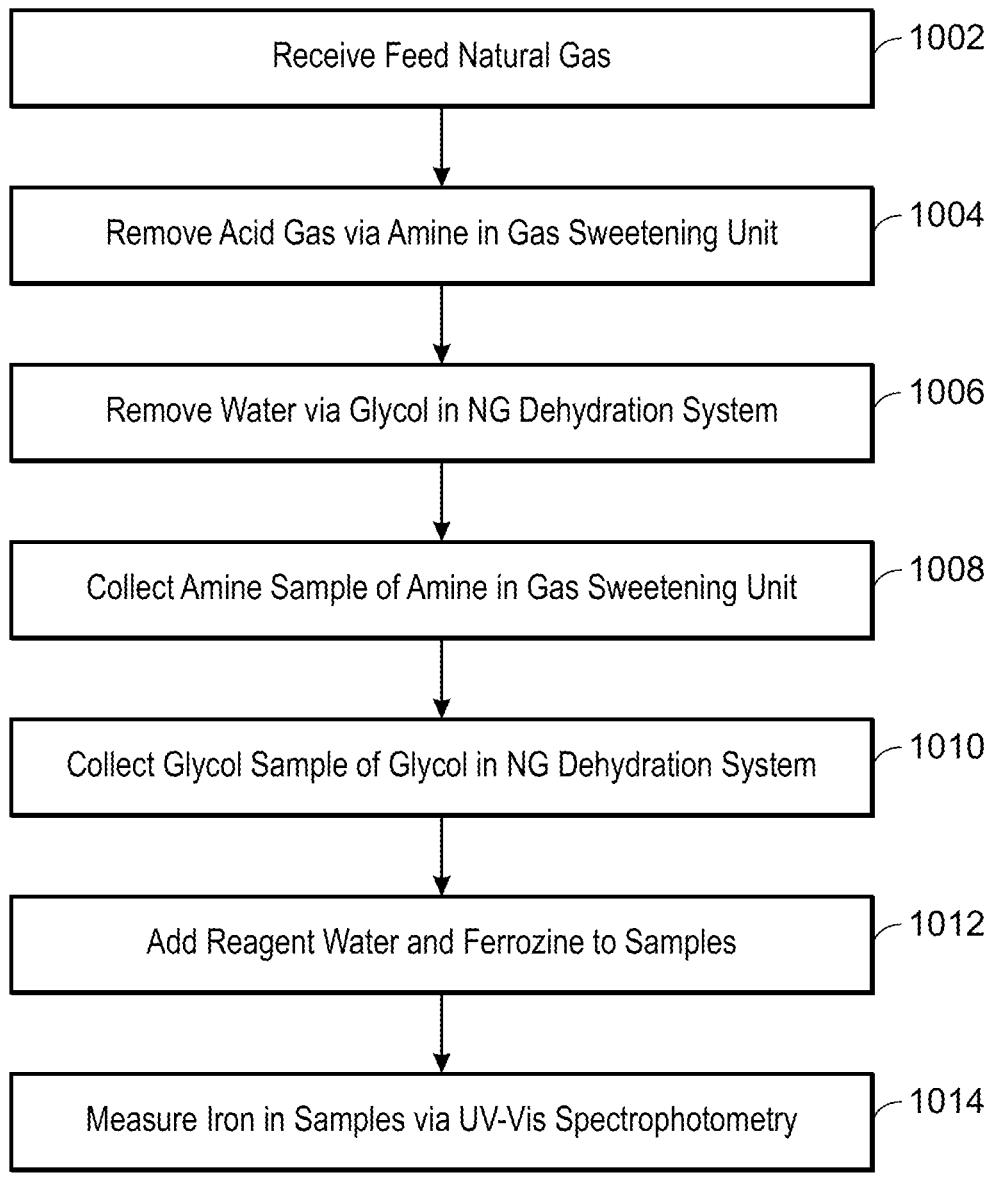
FIG. 7 is a block flow diagram of a method of operating a natural gas (NG) processing plant.

FIG. 7 is a method 1000 of operating a NG processing plant. The NG processing plant can be an onshore NG processing plant, or a facility on an offshore platform. As discussed, a NG processing plant may receive produced (feed) natural gas and remove components, such as acid gas, water (moisture), and hydrocarbons from the produced feed natural gas to give product natural gas that is pipeline quality for distribution to users/consumers. The removal of the hydrocarbons (non-methane hydrocarbons) may be in a NGL recovery unit, as discussed. The non-methane hydrocarbons (each hydrocarbon molecule having more than one carbon atom) have a greater molecular mass (molecular weight, molar mass) than methane.

At block 1002, the method includes receiving feed natural gas, such as from a wellhead or wellhead system. The wellhead and wellhead system may be coupled to a wellbore through which the feed natural gas is produced from a subterranean formation. The feed natural gas may be produced natural gas that is (or approximates) raw natural gas as produced from a subterranean formation in the Earth crust. A natural gas pipeline may transport the feed natural gas from the wellhead or wellhead system to the NG processing plant.

The method includes processing (e.g., blocks 1004 and 1006) the feed natural gas to give product natural gas. As discussed above and below, the processing may involve removing (block 1004) acid gas, removing (block 1006) water, removing non-methane hydrocarbons, etc., from the feed natural gas. The term "non-methane hydrocarbons" may be defined herein as hydrocarbons not including methane. The non-methane hydrocarbons may include ethane, propane, butane, or pentane, or any combinations thereof.

At block 1004, the method includes removing acid gas from the feed natural gas via a gas sweetening unit having an amine absorber column that absorbs the acid gas from the feed natural gas into amine (liquid amine) to remove the acid gas from the feed natural gas. The amine absorber column may also be called a sweetening tower, contactor tower, etc. The amine absorber column removes (scrubs, absorbs) the acid gas from the feed natural gas. See, for example, FIG. 5. The acid gas typically includes carbon dioxide or hydrogen sulfide, or both. For instances of the acid gas including hydrogen sulfide, the hydrogen sulfide removed from the feed natural gas may be provided to a SRU having a catalytic reactor vessel that converts hydrogen sulfide to elemental sulfur.

At block 1006, the method includes removing water from the feed natural gas via a natural gas dehydration system having a column vessel that contacts the feed natural gas with liquid desiccant that is glycol to remove the water from the feed natural gas. The removal of the water from the feed natural gas may involve contacting the feed natural gas with glycol (e.g., TEG) in the column vessel (e.g., contactor column that may be called a contactor tower). See, for instance, FIG. 6.

In view of blocks 1004 and 1006, the method includes processing the feed natural gas to give product natural gas, wherein the processing include removing the acid gas via the gas sweetening unit and removing the water via the natural gas dehydration system. In implementations, the processing can additionally include removing hydrocarbons from the feed natural gas, wherein the hydrocarbons removed include ethane, propane, butane, or pentane, or any combinations thereof.

At block 1008, the method includes collecting an amine sample of the amine in the gas sweetening unit. The amine sample may be collected, for example, from the absorber column or from an amine conduit in the gas sweetening unit conveying the amine. In implementations, the amine sample is automatically collected, such as by a sampling system (having a sample conduit) associated with an online UV-Vis spectrophotometer. In other implementations, the amine sample is manually collected (e.g., into a bottle or container), such as by a human operator via a manual control valve at a sampling port (e.g., along the absorber column or the amine conduit).

At block 1010, the method includes collecting a glycol sample of the glycol in the natural gas dehydration system. The glycol sample may be collected, for example, from the contactor column vessel or from a glycol conduit in the natural gas dehydration system conveying the glycol. The glycol sample may be manually collected (e.g., into a bottle or container), such as by a human operator via a manual control valve at a sample port (e.g., along the contactor column or glycol conduit). The glycol sample may be automatically collected, such as by a sampling system (having a sample conduit) associated with an online.

At block 1012, the method includes adding reagent water (e.g., deionized water) and ferrozine to each of the amine sample and the glycol sample. In implementations, the reagent water includes acid (e.g., nitric acid), such as in the range of 2 vol % to 15 vol %. The reagent water and ferrozine may be added to manually collected samples, for example, in a laboratory. For embodiments of online analyses, the reagent water and ferrozine may be added via a respective online sampling system (associated with a respective online UV-Vis spectrophotometer) to the respective sample as automatically collected by the sampling system.

In implementations, the method further includes adjusting (e.g., increasing) pH of each of the amine sample and the glycol sample (e.g., after the addition of the reagent water and ferrozine) to a pH in a range of 7 to 8.5 via the addition of a carbonate (e.g., sodium carbonate) to the samples. The addition of the carbonate may be manual addition (e.g., in a laboratory) or online automatic addition by a sampling system. A pH sensor can be employed.

At block 1014, the method includes measuring total dissolved iron in each of the amine sample and the glycol sample via UV-Vis spectrophotometry. The method can include measuring the total dissolved iron in the samples with a UV-Vis spectrophotometer, such as in a laboratory, control room, or other building onsite at the NG processing plant.

The method can include measuring total dissolved iron in the amine sample via an online ultraviolet-visible UV-Vis spectrophotometer system disposed along an amine tower or amine conduit conveying amine in the gas sweetening system, wherein the online UV-Vis spectrophotometer system includes an UV-Vis spectrophotometer and an amine sampling system. The amine sampling system includes an amine sample conduit coupled to the amine conduit (or amine tower) to collect the amine sample from the amine flowing through the amine conduit (or amine tower).

The method can include measuring total dissolved iron in the glycol sample via an online ultraviolet-visible UV-Vis spectrophotometer system disposed along contactor tower or glycol conduit conveying glycol in the natural gas dehydration system, wherein the online UV-Vis spectrophotometer system includes an UV-Vis spectrophotometer and glycol sampling system. The glycol sampling system includes glycol sample conduit coupled to the glycol conduit (or contactor tower) to collect the amine sample from the amine flowing through the amine conduit (or contactor tower).

An embodiment is a method of operating a NG processing plant, including receiving feed natural gas and removing acid gas (e.g., hydrogen sulfide or carbon dioxide, or both) from the feed natural gas via a gas sweetening unit having an amine absorber column that absorbs the acid gas from the feed natural gas into amine including liquid amine (e.g., MDEA, DEA, MEA, etc.) to remove the acid gas from the feed natural gas. The method includes removing water from the feed natural gas via a NG dehydration system having a column vessel that contacts the feed natural gas with liquid desiccant including glycol (e.g., TEG) to remove the water from the feed natural gas. The method includes collecting an amine sample of the amine in the gas sweetening unit, and collecting a glycol sample of the glycol in the natural gas dehydration system. The method includes adding reagent water (e.g., deionized water) and ferrozine to each of the amine sample and the glycol sample. The reagent water may include acid (e.g., nitric acid), for example, in a range of 2 vol % to 15 vol %. The method may include adjusting (increasing) pH of each of the amine sample and the glycol sample to a pH in a range of 7 to 8.5, such as via addition of a carbonate (e.g., sodium carbonate). The method includes measuring total dissolved iron via UV-Vis spectrophotometry in each of the amine sample and the glycol sample.

The method may include processing the feed natural gas to give product natural gas, wherein the processing includes removing the acid gas via the gas sweetening unit and removing the water via the natural gas dehydration system. The processing may include removing hydrocarbons from the feed natural gas, wherein the hydrocarbons include ethane, propane, butane, or pentane, or any combinations thereof. The method may include providing the acid gas including hydrogen sulfide removed from the feed natural gas to a sulfur recovery unit (SRU) having a reactor vessel that converts hydrogen sulfide to elemental sulfur.

Another embodiment is method of operating a NG processing plant, including receiving feed natural gas (e.g., from a wellhead) and removing acid gas (e.g., hydrogen sulfide or carbon dioxide, or both) from the feed natural gas via a gas sweetening unit having an amine absorber column that absorbs the acid gas from the feed natural gas into amine including liquid amine to remove the acid gas from the feed natural gas. The method includes measuring total dissolved iron in an amine sample of the amine via a first online UV-Vis spectrophotometer system disposed along an amine conduit conveying the amine in the gas sweetening system, wherein the first online UV-Vis spectrophotometer system (e.g., having a first UV-Vis spectrophotometer) has an amine sampling system (an online automatic sampling system) including an amine sample conduit coupled to the amine conduit to collect the amine sample from the amine flowing through the amine conduit. The method includes removing water from the feed natural gas via a NG dehydration system having a column vessel that contacts the feed natural gas with liquid desiccant including glycol (e.g., TEG) to remove the water from the feed natural gas. The method includes measuring total dissolved iron in a glycol sample of the glycol via a second online UV-Vis spectrophotometer system disposed along a glycol conduit conveying the glycol in the NG dehydration system, wherein the second UV-Vis spectrophotometer system (e.g., having a second UV-Vis spectrophotometer) has a glycol sampling system (an online automatic sampling system) including a glycol sample conduit coupled to the glycol conduit to collect the glycol sample from the glycol flowing through the glycol conduit. The method includes adding, via the amine sampling system, reagent water and ferrozine to the amine sample; and adding, via the glycol sampling system, reagent water and ferrozine to the glycol sample. In implementations, the reagent water includes deionized water. In implementations, the reagent water includes acid (e.g., nitric acid), such as in a range of 2 vol % to 15 vol %. The method may include adjusting, via the amine sampling system, pH of the amine sample to a pH in a range of 7 to 8.5; and adjusting, via the glycol sampling system, pH of the glycol sample to a pH in a range of 7 to 8.5. In implementations, the pH of the amine sample is adjusted via addition of a carbonate to the amine sample by the amine sampling system, and the pH of the glycol sample is adjusted via addition of a carbonate to the glycol sample by the glycol sampling system.

The method include processing the feed natural gas to give product natural gas, wherein the processing includes removing the acid gas via the gas sweetening unit and removing the water via the NG dehydration system. The processing may include removing hydrocarbons from the feed natural gas, wherein the hydrocarbons include ethane, propane, butane, or pentane, or any combinations thereof. The method may include providing the acid gas including hydrogen sulfide removed from the feed natural gas to an SRU having a reactor vessel that converts hydrogen sulfide to elemental sulfur.

A number of implementations have been described. Nevertheless, it will be understood that various modifications may be made without departing from the spirit and scope of the disclosure.

What is claimed is:

1. A method of operating a natural gas processing plant, comprising:
   receiving feed natural gas;
   removing acid gas from the feed natural gas via a gas sweetening unit comprising an amine absorber column that absorbs the acid gas from the feed natural gas into amine comprising liquid amine to remove the acid gas from the feed natural gas;
   collecting an amine sample of the amine in the gas sweetening unit;
   removing water from the feed natural gas via a natural gas dehydration system comprising a column vessel that contacts the feed natural gas with liquid desiccant comprising glycol to remove the water from the feed natural gas;
   collecting a glycol sample of the glycol in the natural gas dehydration system;
   adding reagent water and ferrozine to each of the amine sample and the glycol sample; and
   measuring total dissolved iron via ultraviolet-visible (UV-Vis) spectrophotometry in each of the amine sample and the glycol sample.

2. The method of claim 1, wherein the reagent water comprises deionized water.

3. The method of claim 1, wherein the reagent water comprises acid in a range of 2 volume percent (vol %) to 15 vol %.

4. The method of claim 3, wherein the acid comprises nitric acid.

5. The method of claim 1, comprising adjusting pH of each of the amine sample and the glycol sample to a pH in a range of 7 to 8.5.

6. The method of claim 5, wherein the pH is adjusted via addition of a carbonate.

7. The method of claim 1, comprising processing the feed natural gas to give product natural gas, wherein the processing comprises removing the acid gas via the gas sweetening unit and removing the water via the natural gas dehydration system, wherein the acid gas comprises hydrogen sulfide or carbon dioxide, or both, and wherein the glycol comprises triethylene glycol (TEG).

8. The method of claim 7, wherein the processing comprises removing hydrocarbons from the feed natural gas, wherein the hydrocarbons comprises ethane, propane, butane, or pentane, or any combinations thereof.

9. The method of claim 1, comprises providing the acid gas comprising hydrogen sulfide removed from the feed natural gas to a sulfur recovery unit (SRU) comprising a reactor vessel that converts hydrogen sulfide to elemental sulfur.

10. A method of operating a natural gas processing plant, comprising:
    receiving feed natural gas;
    removing acid gas from the feed natural gas via a gas sweetening unit comprising an amine absorber column that absorbs the acid gas from the feed natural gas into amine comprising liquid amine to remove the acid gas from the feed natural gas;
    measuring total dissolved iron in an amine sample of the amine via a first online ultraviolet-visible (UV-Vis) spectrophotometer system disposed along an amine conduit conveying the amine in the gas sweetening system, wherein the first online UV-Vis spectrophotometer system comprises an amine sampling system comprising an amine sample conduit coupled to the amine conduit to collect the amine sample from the amine flowing through the amine conduit;

removing water from the feed natural gas via a natural gas dehydration system comprising a column vessel that contacts the feed natural gas with liquid desiccant comprising glycol to remove the water from the feed natural gas; and measuring total dissolved iron in a glycol sample of the glycol via a second online UV-Vis spectrophotometer system disposed along a glycol conduit conveying the glycol in the natural gas dehydration system, wherein the second UV-Vis spectrophotometer system comprises a glycol sampling system comprising a glycol sample conduit coupled to the glycol conduit to collect the glycol sample from the glycol flowing through the glycol conduit; adding, via the amine sampling system, reagent water and ferrozine to the amine sample; and adding, via the glycol sampling system, reagent water and ferrozine to the glycol sample.

11. The method of claim 10, wherein the reagent water comprises deionized water.

12. The method of claim 10, wherein the reagent water comprises acid in a range of 2 volume percent (vol %) to 15 vol %.

13. The method of claim 12, wherein the acid comprises nitric acid.

14. The method of claim 10, comprising:
adjusting, via the amine sampling system, pH of the amine sample to a pH in a range of 7 to 8.5; and
adjusting, via the glycol sampling system, pH of the glycol sample to a pH in a range of 7 to 8.5.

15. The method of claim 14, wherein the pH of the amine sample is adjusted via addition of a carbonate to the amine sample by the amine sampling system, and wherein the pH of the glycol sample is adjusted via addition of a carbonate to the glycol sample by the glycol sampling system.

16. The method of claim 10, comprising processing the feed natural gas to give product natural gas, wherein the processing comprises removing the acid gas via the gas sweetening unit and removing the water via the natural gas dehydration system, wherein the acid gas comprises hydrogen sulfide or carbon dioxide, or both, and wherein the glycol comprises triethylene glycol (TEG).

17. The method of claim 16, wherein the processing comprises removing hydrocarbons from the feed natural gas, and wherein the hydrocarbons comprises ethane, propane, butane, or pentane, or any combinations thereof.

18. The method of claim 10, comprises providing the acid gas comprising hydrogen sulfide removed from the feed natural gas to a sulfur recovery unit (SRU) comprising a reactor vessel that converts hydrogen sulfide to elemental sulfur.

19. The method of claim 10, wherein receiving the feed natural gas comprises receiving the feed natural gas from a wellhead, wherein the first online UV-Vis spectrophotometer system comprises a first UV-Vis spectrophotometer, and wherein the second online UV-Vis spectrophotometer system comprises a second UV-Vis spectrophotometer.

* * * * *